United States Patent [19]

Bourguignat et al.

[11] Patent Number: 5,640,275
[45] Date of Patent: Jun. 17, 1997

[54] HEAD-UP DISPLAY DEVICE OF HOLOGRAPHIC TYPE

[75] Inventors: Jérome Bourguignat, Merignac; Jean-Blaise Migozzi, Orsay, both of France

[73] Assignee: Thomson-C.S.F., Paris, France

[21] Appl. No.: 167,482

[22] Filed: Feb. 22, 1988

[30] Foreign Application Priority Data

Feb. 27, 1987 [FR] France ................... 87 02652

[51] Int. Cl.$^6$ .......................... G03H 1/26; C03B 27/22
[52] U.S. Cl. ........................................ 359/630; 359/13
[58] Field of Search ..................... 350/3.7, 3.72, 350/3.85, 174; 359/13, 630

[56] References Cited

U.S. PATENT DOCUMENTS

| | | | |
|---|---|---|---|
| 4,407,564 | 10/1983 | Ellis | 350/3.7 |
| 4,669,810 | 6/1987 | Wood | 350/3.7 |
| 4,735,473 | 4/1988 | Migozzi et al. | 350/3.7 |
| 4,763,990 | 8/1988 | Wood | 350/3.7 |
| 4,776,652 | 10/1988 | Il | 350/3.7 |
| 4,790,613 | 12/1988 | Moss | 350/3.85 |

*Primary Examiner*—Nelson Moskowitz
*Attorney, Agent, or Firm*—Cushman Darby & Cushman, IP Group of Pillsbury Madison & Sutro, LLP

[57] ABSTRACT

The device allows to compensate for the aberrations of the collimating and combining holographic optics by using a simplified scheme for the relay optics. Said relay optics comprises six lenses and a window; it is terminated at each end by a plane side and is disposed in a case. Said relay optics and the holographic optical element are determined taking into account average data for the thickness and curvature of the windshield. The accurate compensation for the windshield deviations is made at a closing glass plate whose thickness is varied. The Folding optical element is a simple reflecting plane mirror and has no correcting effect, which permits the translation along the optical axis of said relay optics and the cathode-ray tube generating the luminous image to be collimated.

7 Claims, 2 Drawing Sheets

HEAD-UP DISPLAY DEVICE OF HOLOGRAPHIC TYPE

BACKGROUND OF THE INVENTION

1. Field of the invention

The present invention relates to a head-up display device, of holographic type and equipped with a simplified relay optics.

2. Description of the prior art

The present invention relates more particularly to head-up displays whose known architecture comprises essentially a generator for a luminous image to display, an holographic optical element, and a relay optics that produces an intermediate image of the luminous image in the focal plane of the holographic optical element, which element plays the role of a combining optics so that the observer sees both the collimated luminous image reflected by this element and the outside world through this element. In addition, a folding optics provided with a reflecting side is disposed between the relay optics and the holographic optical element. The latter is advantageously implemented on a spherical substrate including an hologram and used in an out-of-axis position.

A sight structure of this type is described in particular in the publication "Proceedings of the IEEE, 1982 National Aerospace and Electronics Conference" (NAECON), 1982, volume 2, pages 752 to 759, in a paper of Jerold H. GARD with the title "Holographic HUDs De-mystified"; in this publication, one can in particular refer to FIG. 15 and the related text.

This kind of device exhibits numerous aberrations due to the use of an out-of-axis holographic optics. To correct these defects, a relay optics is used that produces an intermediate image but this optics is generally complex, difficult to define and its correcting ability is limited.

The general trend and the purpose of the present invention are to simplify as much as possible this relay optics and to increase its performance.

A known solution described in the American patent U.S. Pat. No. 4,218,111 and in the corresponding European patent EP-B1-0 007 039 shows a relay optics reduced to nine elements comprising a plane element that is the screen of the cathode-ray tube itself, seven lenses some of which are tilted or out of axis, and an optical filter; in addition, a thenth element playing a correcting role is constituted by a folding prism forming a Mangin mirror.

A further object of the invention is to remedy the complexity of the relay optics by proposing a simplified scheme reduced to six optical lenses. Other features and advantages results in particular from the holographic optical element and the relay optics being computed taking into account the average curvature of the windshield, which allows to manufacture a standard relay optics that exhibits interchangeability aspects on aircraft of one and the same type; the precise matching of this system is performed on an intermediate optical element without optical power constituted by a closing glass plate disposed in the optical path from the folding optical element to the combining holographic element.

BRIEF DESCRIPTION OF THE DRAWINGS

Other features and advantages of the present invention will become apparent from the following description given as an example with reference to the accompanying drawings, in which.

DETAILED DESCRIPTION OF A PREFERRED EMBODIMENT

Figure 1:
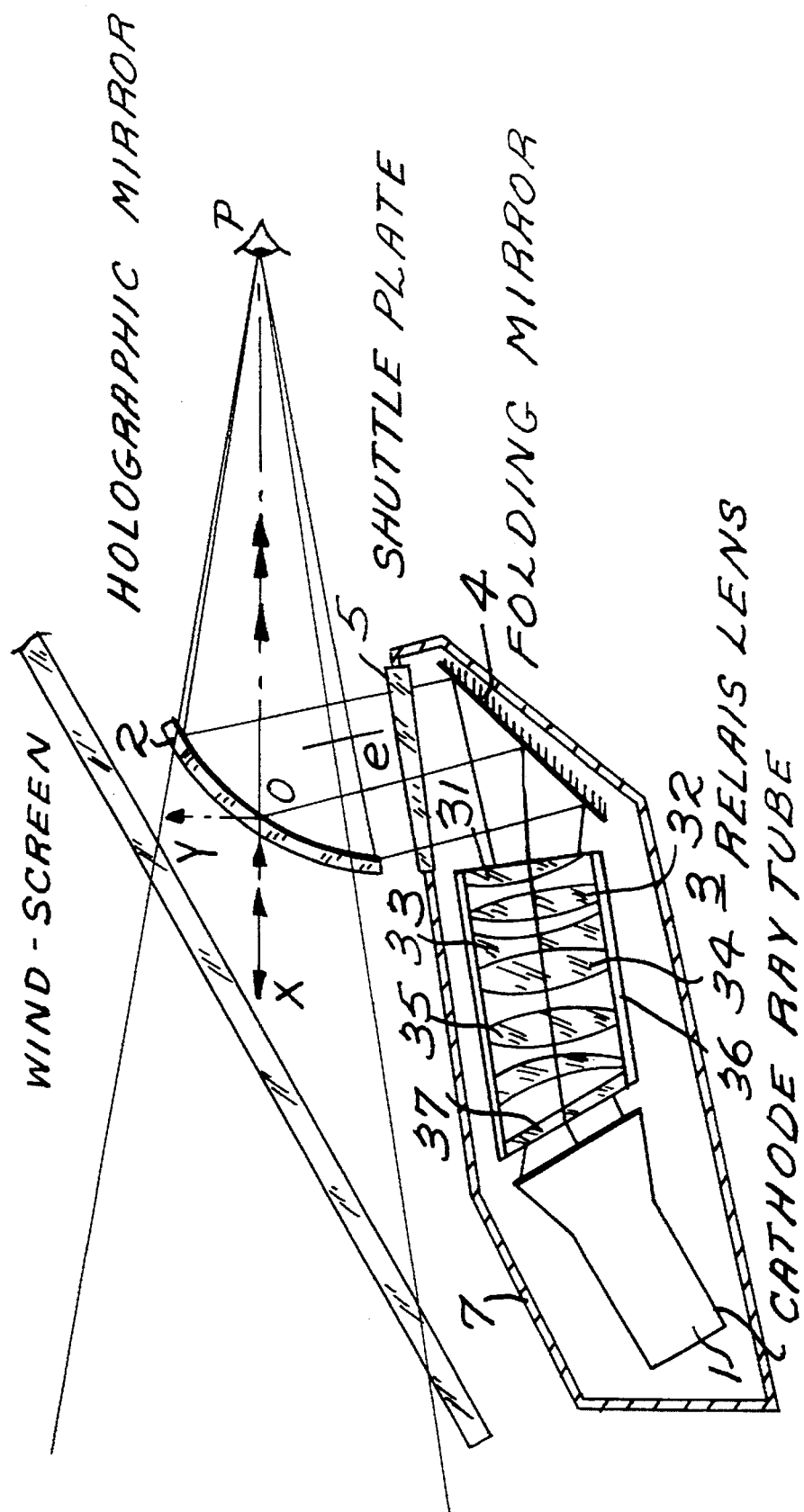
FIG. 1 is a general schematic of a head-up display device according to the present invention.

Referring to FIG. 1, the head-up display device placed behind a windshield of the carrier vehicle, generally an aircraft, includes a generator 1 for a luminous image to be displayed, for example a cathode-ray tube as shown or a liquid-crystal display two-dimensional array, or any other equivalent device that produces a luminous image in a plane or a substantially plane image. This image is collimated by a holographic optical element 2 through which an observer located at P sees also the outside landscape by transparence. A lens system called "relay optics" 3 produces an intermediate image of the luminous image in the focal plane of the holographic optical element 2. A fourth element constituted by a deflection mirror called "folding mirror" 4 is disposed between the output of the relay optics 3 and the holographic mirror. The folding mirror 4 permits to reflect the optical rays along another direction so as to facilitate the positioning of the elements 1 and 3 when the unit is mounted in a carrier vehicle. The elements 1, 3 and 4 are disposed in a housing or behind an instrument panel 7. To ensure a protection against the environment and in particular against dust, a closing glass plate 5 is used and disposed in the optical path from the folding mirror 4 to the holographic mirror 2.

The relay optics 3 is made up of six lens 31 to 36 and a terminal window 37 on the side of the cathode-ray tube 1. The first lens on the side of the folding mirror 4 has a plane output side. The lens made up of the lens elements 33 and 34 forms a doublet for acent mahromatism correction. The optical characteristics of the elements of the relay optics 3 will be indicated in detail later with reference to FIG. 2.

The optical elements making up the relay optics are mounted in a case 30 in which it is possible to introduce an inert gas, for example nitrogen. The case 30 is terminated at its input by a plane side of the window 37, and at its output by a plane Side of the lens 31. The assembly 3 thus equipped can be removed and displaced easily, from one vehicle to another, for example.

The folding optical element used is a plane mirror 4 and not a Mangin mirror. This complicates slightly the computation of the relay optics but allows a much greater operational flexibility as the relay optics 3 can easily se transferred from one vehicle to another vehicle of the same type without the optical quality being impaired.

Figure 3:
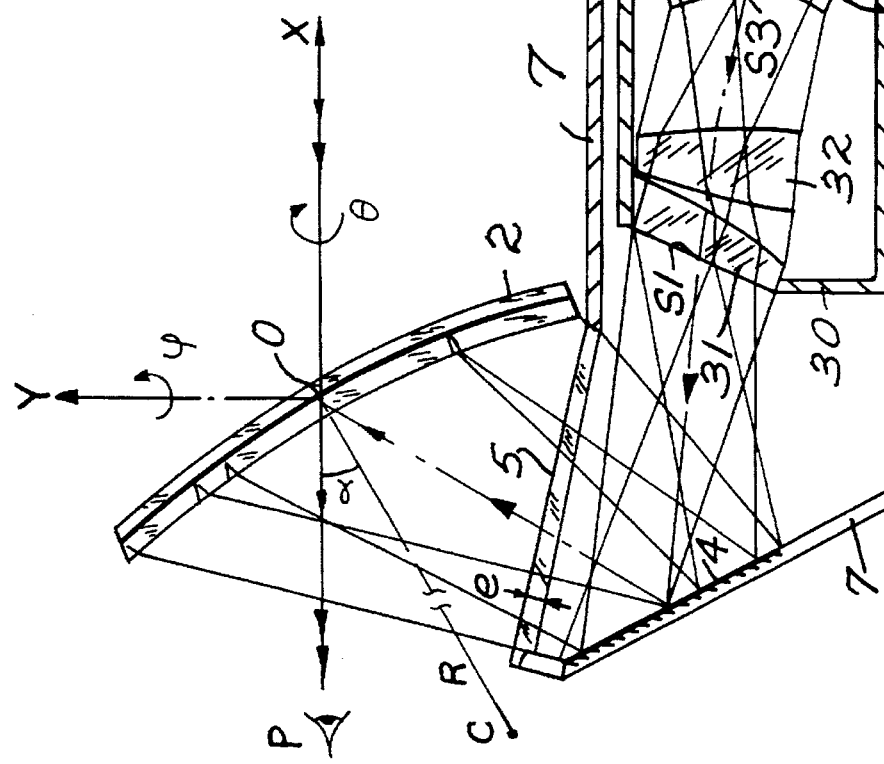
FIG. 3 is a simplified schematic showing the deflection produced by the curvature of the windshield of the airplane or other vehicle in which the head-up display device is mounted.

Referring to FIG. 3, there is shown the optical path of a ray R1 from the target, the latter being assumed to be far away and located in the direction of the X-axis. The ray R2 represents this direction as seen through the head-up display holographic mirror 2. The output rays of the head-up display sight must no longer be parallel to each other since the pilot must perceive them in the same way he perceives the rays from the target deflected by the windshield whose curvature varies. The angular deflection of the rays R1 and R2 due to the windshield at the point in question is indicated by the angle dp.

The computation of the relay optics 3 and of the holographic mirror 2 takes into account the curvature characteristics of an average windshield. By average windshield it is understood a model of windshield intended to be fitted in a given type of vehicle, i.e., all the windshields have the same configuration and the same curvature. However, there are minor differences between individual windshields.

According to the present invention, these differences are compensated for by an intermediate optical element without optical power disposed in the optical path and that is simply constituted by the closing glass plate 5. The compensation is performed by selecting the thickness e of the closing glass plate.

Figure 2:
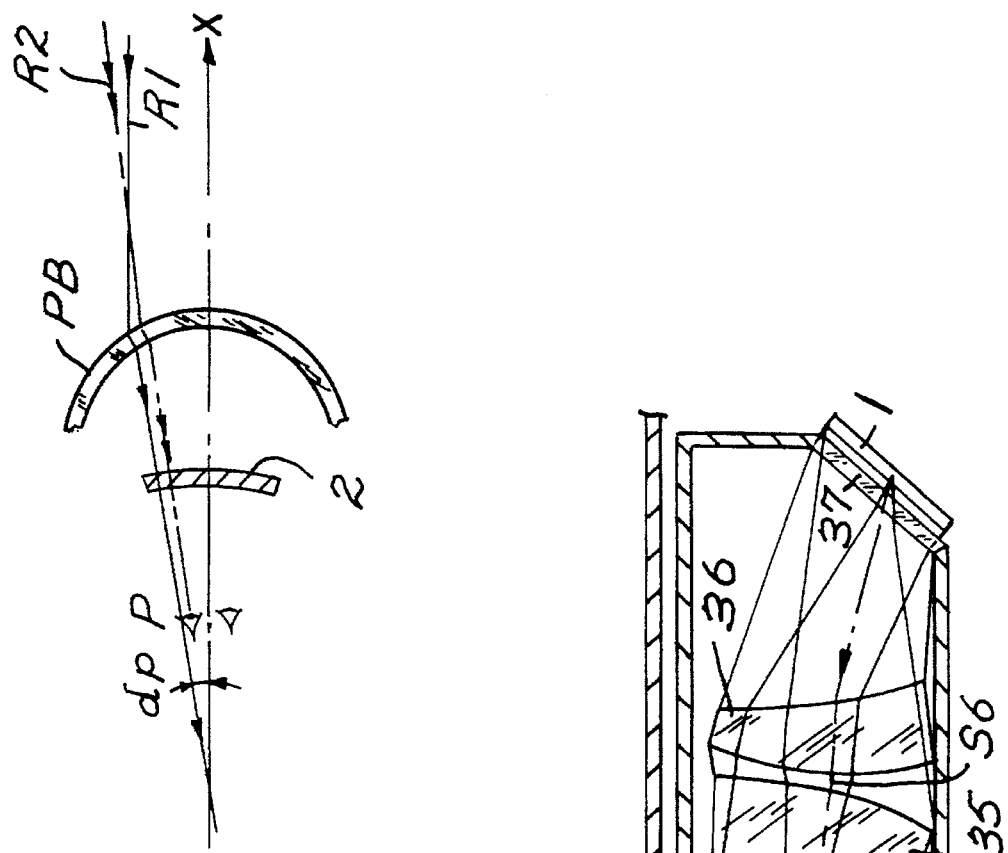
FIG. 2 is a more detailed schematic of the head-up display device of FIG. 1 and in particular of the relay optics.

Referring to FIG. 2, there is shown in more detail the elements of the relay optics 3 comprising a plano-convex lens 31, two convex lenses 32 and 34, a divergent lens 33, a cylindro-convex lens 35 and a meniscus 36. The window 37 is a glass plate with parallel sides.

The following tables indicate the position of the lenses and of the window, as well as the radii of curvature and the thicknesses, respectively.

| Position of the lenses and window | | | | | |
|---|---|---|---|---|---|
| Element | Top/X | Top/Y | Top/Z | Angle θ | Angle φ |
| 31 | 67.2052 | −112.3536 | 0 | −18.65938 | 0 |
| 32 | 93 | −185.4922 | 0 | 9.008556 | 0 |
| 33−34 | 160.5 | −151.5743 | 0 | −4.583662 | 0 |
| 35 | 201.5 | −147.6652 | 0 | −3.415327 | 0 |
| 36 | 221 | −180 | 0 | 5.825859 | 0 |
| 37 | 318.7698 | −175.6418 | 0 | −39.82057 | 0 |

| Radii of curvature and thicknesses | | |
|---|---|---|
| Element | Radius | Thickness |
| 31 | 99999 | 24 |
|  | −179.16 |  |
| 32 | 161.53 | 30 |
|  | 4720 |  |
| 33 | −55.08 | 5.5 |
|  | 84 |  |
| 34 | −85.77 | 37.5 |
| 35 | 492.2894 | 18 |
|  | −159.23 |  |
| 36 | 101.12 | 30 |
|  | 292.6 |  |
| 37 | 99999 | 5 |
|  | 99999 |  |

The X-axis is that corresponding to the normal sighting direction of the observer placed at P. This axis cuts the holographic mirror 2 at the point O that is substantially in the center of the curved surface of this mirror. The X direction is generally parallel to the direction of the longitudinal axis of the plane or other carrier vehicle. The Y-axis lies in the plane of the Figure and is perpendicular to the X-axis at the point O. The tilt angle φ of the lenses and the window about the axis OY is zero for all these elements.

The tilt angles θ about the axis OZ perpendicular to the plane of the Figure are indicated in degrees.

The distances and the radii of curvature are indicated in millimeters.

By top it is understood the point of the output side of the element in question situated on the axis of the optical path. The output side is the side oriented towards the folding mirror 4. Thus for the element 31 the top is indicated by S1. Likewise, the tops of the elements 33 and 36 are designated by S3 and S6, respectively, as an indication. The various tops of the seven elements lie all in the plane of the Figure, i.e., their coordinate along the axis OZ is zero. The output side of the lens 35 is its cylindrical side. The plane surfaces of the lens 31 and of the window 37 are indicated by the value 9999 that is to be translated by a radius of curvature of infinite value. The value 0 for the angle θ corresponds to the alignment with the X-axis, i.e., the optical axis of the element is parallel to the direction OX.

In this configuration of the relay optics 3, it is necessary to also mention the characteristics of the associated holographic mirror 2. The hologram is carried by a spherical surface with the axis CO. It is mounted, in a known manner, sandwiched between two glass plates. The radius of the sphere R=CO, C being the center of curvature, is equal to 370.37 mm and the tilt of the radius CO with respect to the X-axis is given by the angle α equal to 30° 40'.

The windshields of modern military airplanes are not plane and, therefore, produce a deflection of the rays coming from the outside. The head-up display device must superimpose a collimated image with the direction perceived by the pilot and that is then deflected by the windshield when the latter is curved. This effect is illustrated in FIG. 3, described above.

The closing glass plate 5 permits to isolate the interior of the housing 7 where are located the elements 1, 3 and 4 of the head-up display sight from the various outside aggressive factors, in particular dust and scratches. It also ensures the passage of the light rays from the folding mirror 4 to the holographic mirror 2. In addition, this glass plate 5 is designed so as to compensate for the deflection deviations between the average windshield used for the computation of the holographic mirror 2 and the relay optics as a whole, and the real windshield mounted on the carrier vehicle, it being understood however that these windshields have a substantially similar form as they are designed for one and the same type of vehicle. To this end, the glass plate 5 has a variable thickness. As an example, there is shown an increasing thickness, which gives the plate 5 a prismatic shape, but the thickness could vary in a more complex manner.

The head-up display device according to the present invention also exhibits a relay optics with a small number of lenses see since they are only six. The couple 33–34 of these lenses Forms an achromatism correcting doublet. In addition to the above-mentioned Features, the relay optics can be built in a standard form for a number of similar equipments intended for mounting in vehicles of the same kind or having a windshield with a comparable curvature.

What is claimed is:

1. A head-up display device comprising a generator of a luminous image to be displayed, a holographic optical element, a relay optics that produces an intermediate image of said luminous image in the focal plane of said holographic optical element, which element plays the role of a combining optics so that the observer sees both said luminous image collimated and reflected on this element and the outside world through this element, and a folding element with a reflecting surface disposed between said relay optics and said holographic optical element, said relay optics being made up of six lens elements numbered in their order of interposition in the optical path from said folding element to said generator of luminous image, these lens elements having the technical characteristics indicated in the following tables where the radius of curvature, the thickness and the coordinates of the top are expressed in millimiters and the angles in degrees, the top being the intersection of the axis of the optical path and the side of the element oriented towards said folding element, the indicated angles being those of tilt of said lens element about two perpendicular axes forming a reference trihedron with a third direction corresponding to the normal sighting direction of the observer:

Position of the lenses and window

| Element | Top/X | Top/Y | Top/Z | Angle θ | Angle φ |
|---|---|---|---|---|---|
| 31 | 67.2052 | −112.3536 | 0 | −18.65938 | 0 |
| 32 | 93 | −185.4922 | 0 | 9.008556 | 0 |
| 33–34 | 160.5 | −151.5743 | 0 | −4.583662 | 0 |
| 35 | 201.5 | −147.6652 | 0 | −3.415327 | 0 |
| 36 | 221 | −180 | 0 | 5.825859 | 0 |
| 37 | 318.7698 | −175.6418 | 0 | −39.82057 | 0 |

Radii of curvature and thicknesses

| Element | Radius | Thickness |
|---|---|---|
| 31 | 99999 | 24 |
|    | −179.16 |  |
| 32 | 161.53 | 30 |
|    | 4720 |  |
| 33 | −55.08 | 5.5 |
|    | 84 |  |
| 34 | −85.77 | 37.5 |
| 35 | 492.2894 | 18 |
|    | −159.23 |  |
| 36 | 101.12 | 30 |
|    | 292.6 |  |
| 37 | 99999 | 5 |
|    | 99999 |  |

2. A head-up display device according to claim 1, wherein said relay optics is made up of six lenses and one terminal window, said lenses including successively a plano-convex lens whose plane side is oriented towards said folding element, a convex lens, a concave lens, an achromatism doublet comprising a convex lens and a cylindro-convex lens, and a meniscus, said window being a glass plate with parallel sides positioned parallel in a plane of said generator where said luminous image is formed.

3. A head-up display device according to claim 2, wherein said six lenses and said window are mounted in a case fitted with a closing glass plate disposed in the optical path from said folding element to said holographic optical element.

4. A head-up display device according to claim 3, wherein said holographic optical element and said relay optics are determined taking into account the thickness of an average windshield mounted on the vehicle carrying said device and through which takes place the vision of the outside world by the observer, said relay optics being built so as to be standard and forming a replaceable element.

5. A head-up display device according to claim 4, wherein said folding element is a simple reflecting plane mirror.

6. A head-up display device according to claim 4, wherein the curvature deviations between said average windshield defined for the computation of said holographic optical element and said relay optics, and the real windshield mounted on said vehicle are compensated for by said closing glass plate whose thickness is variable and modified accordingly.

7. A head-up display device according to claim 5, wherein the curvature deviations between said average windshield defined for the computation of said holographic optical element and said relay optics, and the real windshield mounted on said vehicle are compensated for by said closing glass plate whose thickness is variable and modified accordingly.

* * * * *